United States Patent [19]
Gebb

[11] Patent Number: 6,067,532
[45] Date of Patent: May 23, 2000

[54] TICKET REDISTRIBUTION SYSTEM

[75] Inventor: Lucas Gebb, New York, N.Y.

[73] Assignee: American Express Travel Related Services Company Inc., New York, N.Y.

[21] Appl. No.: 09/115,398

[22] Filed: Jul. 14, 1998

[51] Int. Cl.$^7$ ..................................................... G06F 17/60
[52] U.S. Cl. ..................... 705/37; 705/1; 705/5
[58] Field of Search ....................... 705/37, 1, 5

[56] References Cited

U.S. PATENT DOCUMENTS

| | | | |
|---|---|---|---|
| 4,674,044 | 6/1987 | Kalmus et al. | 705/37 |
| 4,799,156 | 1/1989 | Shavit et al. | 705/26 |
| 5,283,731 | 2/1994 | Lalonde et al. | 705/1 |
| 5,408,417 | 4/1995 | Wilder | 705/5 |
| 5,557,517 | 9/1996 | Daughterty, III | 705/37 |
| 5,592,375 | 1/1997 | Salmon et al. | 705/7 |
| 5,621,797 | 4/1997 | Rosen | 380/24 |
| 5,644,721 | 7/1997 | Chung et al. | 705/6 |
| 5,664,115 | 9/1997 | Fraser | 200/175 |
| 5,689,652 | 11/1997 | Lupien et al. | 705/37 |
| 5,794,207 | 8/1998 | Walker et al. | 705/1 |
| 5,797,127 | 8/1998 | Walker et al. | 705/5 |
| 5,930,761 | 7/1999 | O'Toole | 705/5 |

OTHER PUBLICATIONS

Bittle, Scott: "UniTravel Selling consolidator tickets on line", Travel Weekly, v55, n23, p74(1), Mar. 21, 1996.
Pina, Michael, "Consolidator: trade should not be leery of us." Travel Weekly, v54, n10, p31(1), Feb. 6, 1995.
Elliott, Elaine X., "Low Fares Online Travel Agents launch Internet sites to market their air consolidation services", Travel Agent, Mar. 31, 1997 p.22.

*Primary Examiner*—Allen R. MacDonald
*Assistant Examiner*—Jagdish Patel
*Attorney, Agent, or Firm*—Snell & Wilmer L.L.P.

[57] ABSTRACT

The present invention includes a reliable and efficient method for redistributing, purchasing or selling tickets on the secondary market. The system generally includes a method for accepting tickets from individual sellers, posting the tickets on a central database for redistribution, establishing a market price based on demand and/or a service fee (this feature may not be available in certain states due to resale restrictions or at certain arenas due to prior agreements) and redistributing the tickets to new buyers. The system allows sellers to reach a wider market and also gives more individuals an opportunity to conveniently purchase tickets to events at a reasonable price. Individual buyers are not forced to deal directly with brokers, scalpers or other types of sellers, and thus, are substantially protected from fraud. To protect the buyer, the present invention verifies all tickets posted on the database and, to protect the seller, verifies the buyer's credit card and guarantees payment to the seller.

16 Claims, 5 Drawing Sheets

TICKET REDISTRIBUTION SYSTEM

FIELD OF THE INVENTION

The present invention generally relates to the redistribution of event tickets, and more particularly, to an automated system for posting event tickets for sale, allowing purchase of the tickets at face value or at a market price based on demand and/or a service fee and distributing new tickets to the new owner.

BACKGROUND OF THE INVENTION

Event tickets, such as tickets for access to sporting events, plays, concerts and/or the like, are usually sold, in bulk as a season ticket package or individually, through ticket windows at the event, ticket distributors located at department stores, large ticket agencies or directly between friends and business associates. Typically, the ticket is initially sold at a preset price which is printed on the ticket (known as "face value"). After obtaining the event tickets, the new ticket holders may not be able to attend the event, so they typically give the ticket to friends or re-sell the ticket on a secondary market, such as ticket brokers, at an inflated price.

Although the secondary market often allows ticket holders to re-sell their tickets, many disadvantages exist with the current methods of ticket redistribution on the secondary market. Since most secondary markets often lack proper discipline and organization, many original tickets remain unused, or are sold at an inflated price, while the event organizers receive no additional profits from the resold tickets. Moreover, organizers typically do not have a comprehensive ticket redistribution policy to fill many of the "no-show" seats, even though people may be willing to purchase the unused tickets, because the organizer already received its profits which were incorporated into the face value sale. For example, during the 1997–98 season, the NY Jets sold out every football game with 76,889 tickets per game, yet had an average attendance of 67,897, thereby resulting in 8,992 "no-shows" per game.

If the original ticket outlets are sold out of tickets and no tickets are available for the event, the secondary market is often the only way for people to obtain tickets to the popular event. People who desperately want to attend an event in which optimal seats are sold out are often forced to go to the event itself in hopes of obtaining tickets from a person who re-sells the tickets in front of the event arena (known as a "scalper"). The buyer is typically forced to deal directly with scalpers who will often offer tickets at an inflated price because the scalper must collect a profit from the re-sale of the ticket. Therefore, buyers are typically forced to drive long distances to the arena with knowledge of the possibility that they may not be able to obtain desired seat selections at reasonable prices. Often, many potential ticket buyers choose not to go to the event because of the inconvenience and uncertainty of the secondary market.

On the other side of the transaction, secondary market sellers are also hindered by the present secondary system because they often are unable to reach a wide group of potential buyers. Due to the typical lack of a large pool of buyers at a centralized convenient location, sellers are forced to either try to scalp tickets at the event itself or try to sell, or at times give away the tickets at no cost, to a social or business associate. Both of these methods are inefficient and inconvenient for the seller.

Moreover, many people who own season tickets have no convenient method for selling their extra tickets, even at face value, so they often give the tickets away or simply do not use the tickets. Resources are wasted because there are other people who would happily pay a fair price for tickets to an individual game. A convenient method of selling tickets on the secondary market is needed such that people have confidence in the resale transaction, the availability of the ticket and the authenticity of the ticket that is purchased and have a greater incentive to purchase season tickets because of the substantial assurance of re-selling the unneeded tickets.

SUMMARY OF THE INVENTION

The present invention includes a reliable and efficient method for redistributing, purchasing or selling tickets on the secondary market. The system generally includes a method for accepting tickets from individual sellers, posting the tickets on a central database for redistribution, establishing a market price based on demand and/or a service fee (this feature may not be available in certain states due to reselling restrictions or at certain arenas due to prior agreements) and redistributing the tickets to new buyers. The system allows sellers to reach a wider market and also gives more individuals an opportunity to conveniently purchase tickets to events at a reasonable price. Individual buyers are not forced to deal directly with brokers, scalpers or other types of sellers, and thus, are substantially protected from fraud. To protect the buyer, the present invention verifies all tickets posted on the database and, to protect the seller, verifies the buyer's credit card and ensures payment to the seller.

Potential sellers enroll with the system manager, via telephone, fax, mail, E-mail or Internet, by providing an address, a credit card and/or any other security information which are verified by an automated host system located at the system manager. Once sellers are entered into the system, they are allowed to consign tickets to the host system by faxing the ticket information to the system manager, and then, mailing the actual tickets to the system manager. Upon receipt of a sales request, and even before receiving a hard copy of the ticket, the system verifies the seller, the credit card used (which will be credited if the tickets are sold), the tickets consigned, and the timing of the event. The system only allows a consignment at a predetermined time before the event and the system automatically removes tickets at a predetermined time before the beginning of the event. Depending on the laws of the particular state and the agreement with the specific arena, team or other entity, the system automatically determines the price for the ticket. Pursuant to a venue agreement or state laws restricting the resale value of a ticket, the system will set a fair market price for the tickets based on a bidding process. If the state has restriction on the resale of a ticket, the system will simply add a nominal service fee to the face value of the tickets.

A potential buyer may browse the available ticket database via the Internet or phone. When buyers decide to purchase a ticket, the purchase is conducted via a typical credit card transaction and the buyer is given an option for receipt of the tickets. The buyer's credit card is verified and an additional service charge is added to the ticket price. Tickets are reprinted and distributed either in the mail, electronically, at the event's will-call window or at a kiosk with the original ticket kept on file at the system manager. After the occurrence of the event and receipt of original ticket, the seller's credit card is eventually credited for the amount of the sale price less any service fees, if applicable.

BRIEF DESCRIPTION OF DRAWING FIGURES

The present invention will now be described in connection with the appended drawing figures, wherein like numerals represent like elements, and:

DETAILED DESCRIPTION OF PREFERRED EXEMPLARY EMBODIMENTS

Figure 1:
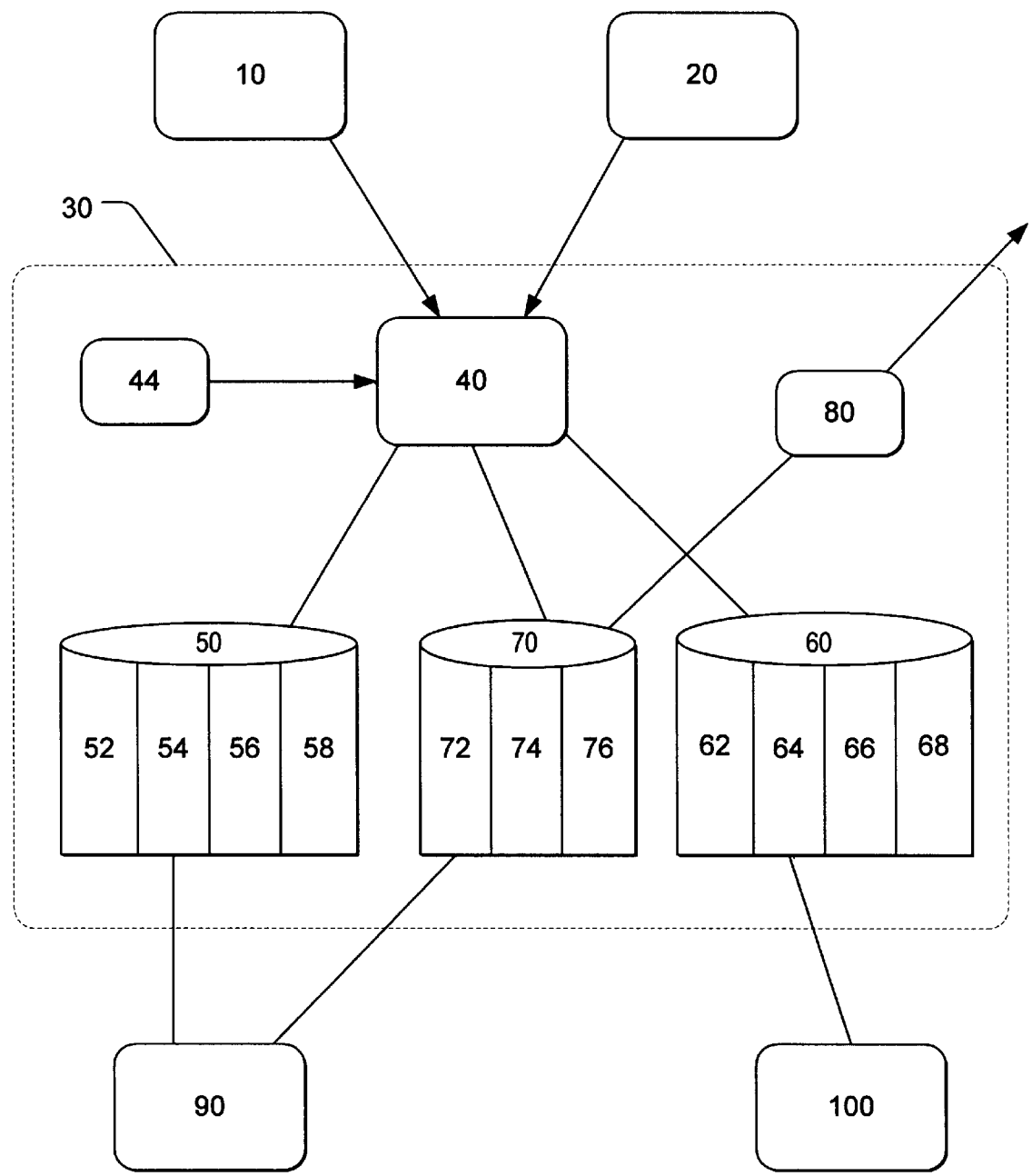
FIG. 1 shows an exemplary overview of components of a ticket redistribution system in accordance with a preferred embodiment of the present invention.

The present invention generally includes a substantially reliable and efficient apparatus and method for redistributing, purchasing or selling tickets on a secondary market, wherein the secondary market is generally defined as the "second sale" of an event ticket. Although the various embodiments will be described in relation to the secondary market (the reselling of an event ticket), one skilled in the art will appreciate that the present invention is also applicable to initial sales of tickets to buyers or entities or the simple storage of tickets by a season ticket holder. A "seller", as disclosed herein, includes any owner of an event ticket, such as, for example, a season ticket holder, an initial purchaser of an event ticket, a person who receives an event ticket as a gift or prize or any organization/entity which has the right to sell an event ticket. One skilled in the relevant art will appreciate that an event ticket includes any suitable means for authorization which allows entry into the event which corresponds to the authorization including, for example, a paper/cardboard ticket, a physical token, an electronic token, a stamp, a bar-coded ticket, a ticket with a magnetic stripe or any other electronic or physical means for approving access to an event. Such events generally include, for example, sporting events, plays, concerts and/or the like.

The present system preferably includes various servers, databases and networking devices which are suitably configured to accept tickets from individual sellers, post the tickets on a central database for redistribution, establish a market price based on demand and/or a service fee (as discussed below, this feature may not be available in certain states due to restrictions on the resale of tickets or at certain arenas due to prior agreements) and redistribute the tickets to new buyers. With respect to FIG. 1, in a preferred embodiment, to perform the aforementioned functions sellers and buyers suitably communicate with host system 30, wherein host system 30 includes a networking device 40, a seller server 50, a ticket server 60, and a buyer server 70. With respect to FIG. 2, specific steps in the ticket redistribution process are disclosed which preferably include enrollment 110, consignment 112, browse/select 114, payment 116, ticket distribution 118 and seller credit 120. One of ordinary skill in the relevant art will appreciate that, although the ticket redistribution steps are disclosed in a preferable order, any of the aforementioned steps 110–120 can be performed in any suitable order in accordance with the intended scope of the present invention.

With respect to FIG. 1, the seller preferably communicates with host system 30 via any device suitably configured to transmit information to host system 30. For example, seller input device 10 includes a voice recognition unit, a facsimile machine, a telephone, a kiosk, a computer terminal for transmitting information through a modem connection or an Internet connection, a direct keyboard connection to the host system 30, and/or the like. Buyer input device 20 is also preferably any suitable device configured to communicate with host system 30. Buyer input device 20 includes any of the aforementioned embodiments for seller input device 10, and moreover, buyer input device 20 is, in one embodiment, the same device as seller input device 10. In other embodiments, buyer input device 20 is configured as a separate device from seller input device 10. In a preferred embodiment, seller input device 10 is seller's computer terminal configured to access the Internet and buyer's input device 20 is buyer's computer terminal configured to access the Internet.

Figure 2:
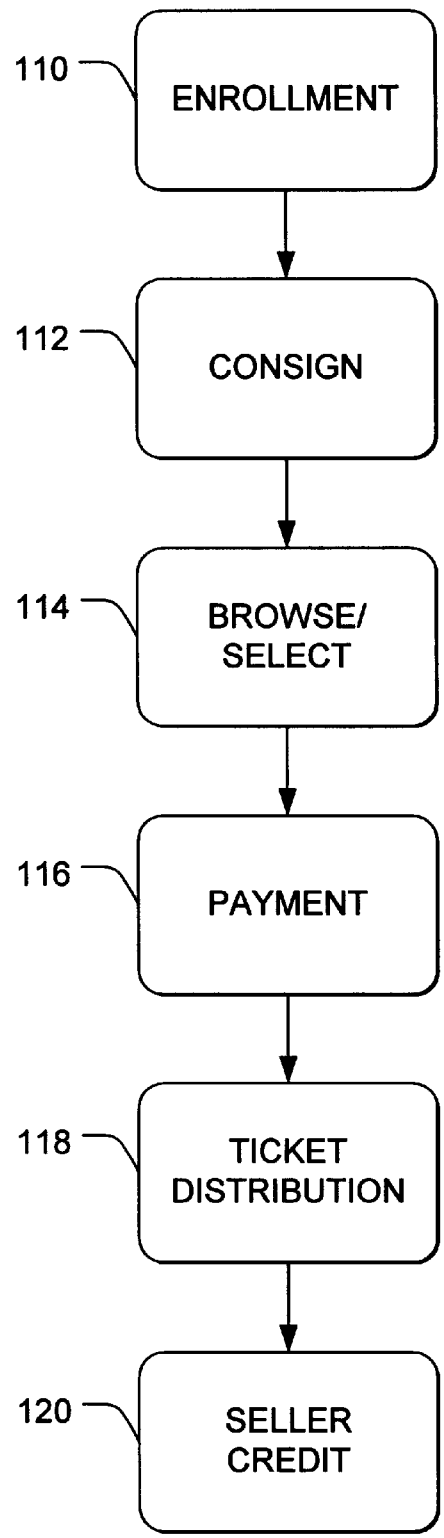
FIG. 2 shows an exemplary overview of a general method for redistributing tickets in accordance with a preferred embodiment of the present invention.

With continued reference to FIG. 1, host system 30 preferably includes various servers, databases and networking devices for communicating with seller input device 10 and buyer input device 20 and for suitably storing and organizing information related to enrollment 110, consignment 112, browse/select 114, payment 116, ticket distribution 118 and seller credit 120 (see FIG. 2). Host system 30 preferably includes network/interface device 40 which communicates with seller input device 10 and buyer input device 20, wherein both devices 10,20 are preferably external to the host system 30. Although the components and interfaces within host system 30 are described in a preferred embodiment, one skilled in the art will appreciate that the scope of the present invention includes any arrangement of components and interfaces which are suitably configured to perform the various ticket redistribution functions 110–120 (see FIG. 2).

Network/interface device 40 suitably communicates internally with host input device 44, seller server 50, ticket server 60 and buyer server 70. Network/interface device 40 preferably incudes a suitable switching device (e.g., PBX), an interactive telephone menu interface, a web page, a router and/or the like. Network/interface device 40, in another embodiment, includes a live operator which accepts information from sellers and buyers in the form of paper requests via mail, electronic requests via electronic mail or Internet, verbal requests via telephone, written requests via facsimile and/or the like. In this alternative embodiment, the live operator inputs the information received from the sellers and buyers into network/interface device 40 via host input device 44. As such, host input device 44 is any suitable device configured to input information into host system 30. In a preferred embodiment, host input device 44 is a computer terminal with a keyboard, whereby the live operator manually enters data into host system 30 and populates requested field inputs.

With continued reference to FIG. 1, seller server 50 is any device or combination of devices suitably configured to receive and store information, verify information, accept authorization information and communicate with network/interface device 40. In a preferred embodiment, seller server 50 includes a demographic database 52, a credit card database 54, a fraud database 56, an address database 58, and any other suitable databases necessary for operation of the present invention. One skilled in the art will appreciate that any of the databases located in seller server 50 suitably communicate with other databases or other systems. In a preferred embodiment, credit card database 54 suitably communicates with a known central authorization system 90. Central authorization system 90 can be located within host system 30 or external to host system 30, but in a preferred embodiment, central authorization system 90 is an existing central authorization system, such as an American Express, Visa or MasterCard authorization system, located external to host system 30. Alternatively, central authorization system 90 is a debit card, check, smart card or other financial authorization system.

In a preferred embodiment, ticket server 60 is any device or combination of devices suitably configured to receive and store event ticket information. Ticket server 60 preferably includes ticket database 62, current date database 64, state law database 66, offer database 68 and any other suitable database configured to store information related to event tickets. Ticket database 62 preferably includes event and ticket-related fields such as, for example, title of event, arena location, seat information (seat, row, section), date of event and any other field helpful in identifying the ticket. In one embodiment, ticket database 62 suitably communicates with a master arena database 100 wherein master arena database 100 is any database or combination of databases suitably configured to include a substantial amount of information related to events and available tickets. In a preferred embodiment, master arena database 100 includes information obtained from various venues, teams, promoters, arenas or any other suitable entity which provides similar information.

Buyer server 70 is any device or combination of devices suitably configured to store information related to the buyer and to communicate with network/interface device 40, central authorization system 90 and output device 80. In a preferred embodiment, buyer server 70 includes a demographic database 72, a credit card database 74, an address database 76, and any other suitable database helpful for recording buyer information relating to the redistribution of tickets in accordance with the present invention. Credit card database 74 suitably communicates with a central authorization system 90 to verify a buyer's credit card information. Buyer credit card database 74 and seller credit card database 54 preferably communicate with the same credit authorization system 90; however, one of ordinary skill in the art will appreciate that the databases 54, 74 can communicate with different authorization systems. Also, one skilled in the art will appreciate that any form of payment is within the scope of the present invention including, for example, cash, debit card, check, smart card and/or the like. In these embodiments, authorization system 90 is any respective payment authorization system.

Buyer server 70 also preferably communicates with output device 80 wherein output device 80 is any device suitably configured to deliver an event ticket to a buyer or an authorization for an event ticket to a distributor of tickets. Output device 80 preferably includes a ticket printer and an electronic mail/Internet interface. Output device 80 is suitably configured to print a ticket directly from host system 30 wherein the ticket is subsequently mailed or delivered to the buyer. Output device 80 alternatively instructs a remote printer to print an event ticket which can be retrieved directly by the buyer at, for example, a kiosk or a will-call window. Another alternative embodiment includes output device 80 configured to distribute electronic information over an electronic mail/Internet system, thereby transmitting ticket distribution authorizations to corresponding electronic interfaces located at will-call windows or kiosks. In a preferred embodiment, output device 80 includes all of the aforementioned options for ticket distribution, thereby allowing the buyer to select the most convenient method for obtaining the event ticket.

Figure 3:
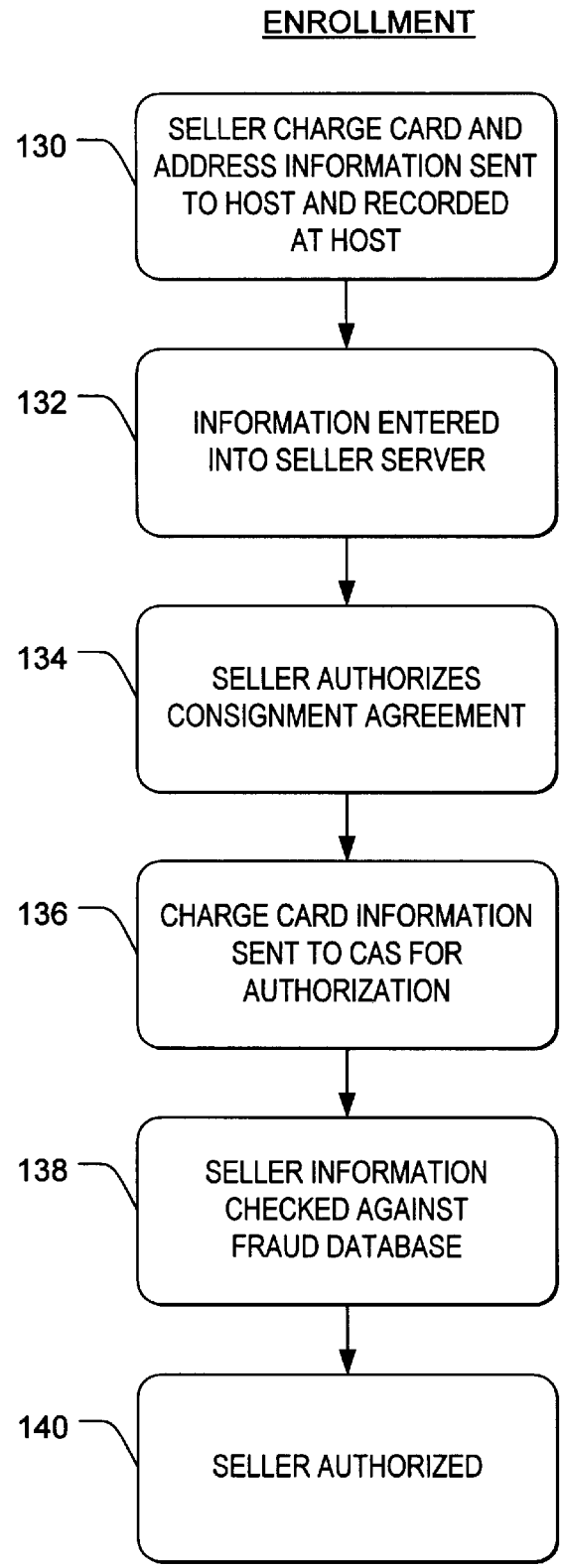
FIG. 3 shows an exemplary overview of an enrollment procedure in accordance with a preferred embodiment of the present invention.

With respect to FIG. 3, the details of the enrollment procedure 110 are disclosed. When selling tickets in accordance with preferred exemplary embodiments of the present invention, the seller first enrolls in the ticket redistribution system (110 of FIG. 2). The enrollment procedure includes any apparatus and method, or combination thereof, suitably configured to obtain information from the seller and verify selected information. One skilled in the art will appreciate that the system may be configured to accept any type of information helpful for enrolling the seller; however, in a preferred embodiment, seller enters demographic, credit card, PIN (or other security information) and address information into seller input device 10 (step 130). The information entered at seller input device 10 is transmitted to host system 30 and suitably captured and routed by network/interface device 40 to seller server 50 (step 132). Seller server 50 suitably stores the information into its respective databases 52, 54 and 58. In one embodiment, interface device 40 next sends a consignment data packet to the seller's computer screen requesting that the seller approve the consignment agreement with the host organization (step 134). The consignment agreement establishes that the seller, depending on federal or state laws, may be liable for the ticket value, or a potential increased value, for a fraudulent redistribution. One skilled in the art will appreciate that host system 30 alternatively causes a paper consignment agreement to be sent via mail to the seller requesting the seller's written signature and return of the consignment agreement to the system manager. Seller server 50 next sends an authorization request to central authorization system 90, wherein the authorization request includes the seller's credit card information or other payment information (step 136). Seller server 50 also suitably compares information in demographic database 52 and address database 58 with fraud database 56 to determine if an individual seller previously registered with the system and previously conducted a fraudulent or unauthorized transaction (step 138). If the seller information and credit card information are authorized, seller server 50 authorizes the seller to consign tickets on host system 30 and informs the seller of the authorization status (step 140).

Figure 4:
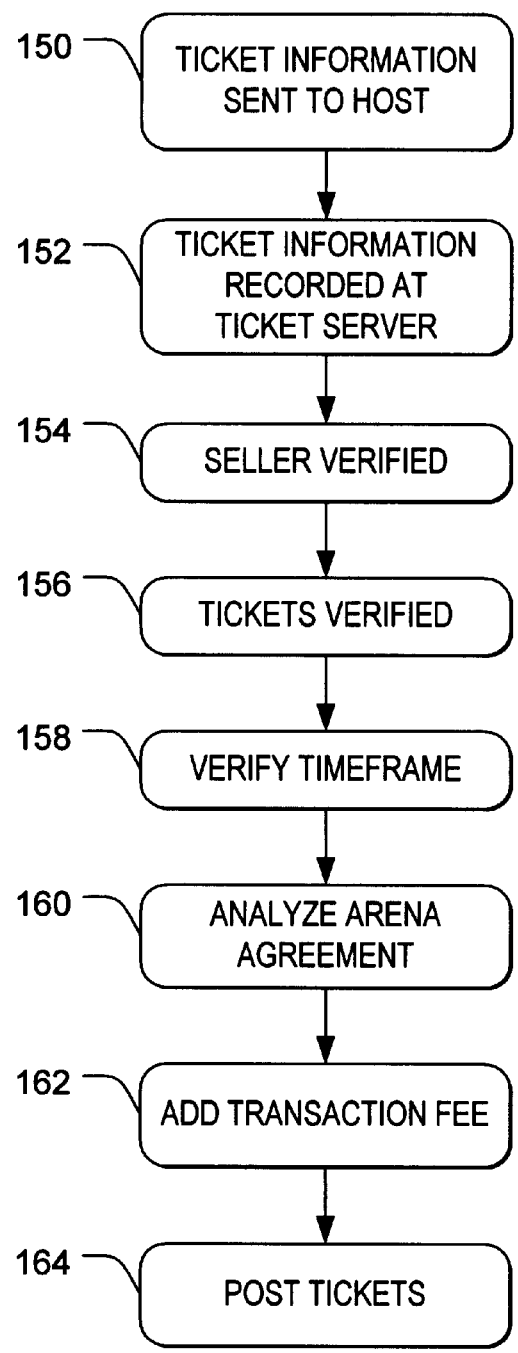
FIG. 4 shows an exemplary overview of an consignment procedure in accordance with a preferred embodiment of the present invention; and, FIG. 5 shows an exemplary overview of an ticket distribution procedure in accordance with a preferred embodiment of the present invention.
Figure 5:
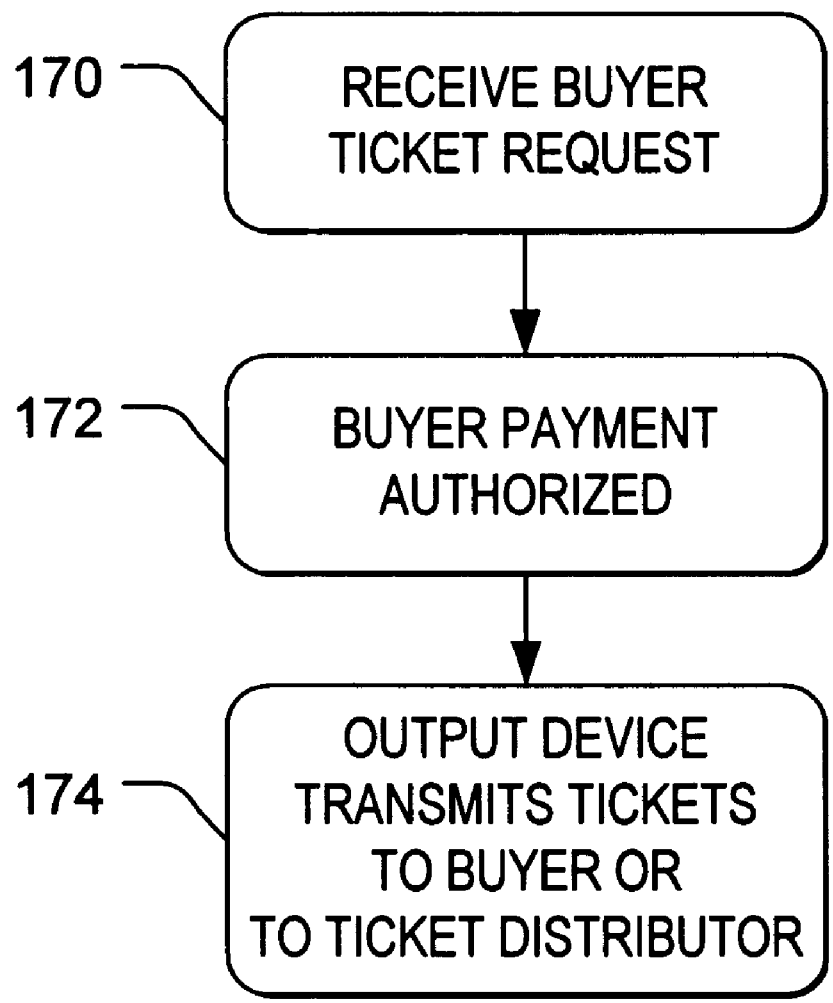

With respect to FIG. 4, an exemplary consignment process is disclosed (112 of FIG. 2). After enrolling in the ticket redistribution system, as discussed above, the seller is authorized to consign an event ticket to host system 30 for sale and distribution to an interested buyer. While the consignment process will be described as a preferred embodiment of the present invention, one skilled in the art will appreciate that any consignment process which suitably posts event tickets on a central system, using any suitable combination of components, component interfaces and any ordering of process steps is within the scope of the present invention. With respect to FIGS. 1 and 4, the seller preferably enters the ticket information into a seller input device 10, which suitably transfers the information to network interface device 40 (step 150). As discussed above, to enter the information, the seller either faxes, telephones or electronically sends the ticket information to network interface device 40 or calls a live operator which inputs the information via host input device 44 into network interface device 40. Network interface device 40 suitably routes the ticket information to ticket server 60 wherein the ticket information, namely event, arena, seat (seat, row, section) and date, is suitably recorded in ticket database 62 (step 152).

In an alternative embodiment, an owner of season tickets, in lieu of receiving some or all of the paper tickets, posts some or all of the tickets on host system 30, thereby allowing the season ticket holder to determine if he/she wants to go to an event before the tickets are originally printed. The season ticket ticket holder would then have the option of attending specific events or exchanging tickets if unable to attend or decide to attend the event based on other offers for the tickets within the present system. As an alternative embodiment, tickets are printed upon original ticket holder's request or buyer's request. Moreover, the ticket holder does not have to worry about bringing tickets to each event because the original ticket holder can simply request that host system 30 authorizes redistribution of the tickets at the will call window to the seller or the ticket holder can use a ticketless entry into the event, such as, for example, by an e-token on a smart card.

The seller then preferably relinquishes rights to the original ticket which includes, for example, mailing the physical tickets to the system manager, electronically canceling the ticket or other suitable means for restricting use of the original ticket (deactivating bar code, magnetic stripe or other electronic authorization to avoid attempted multiple uses of a ticket for the same seat). However the relinquishment of the original ticket preferably does not impede the redistribution process, but it may, as discussed below, delay the seller from receiving credit for the resale. One skilled in the art will appreciate that the process of relinquishing the original ticket could be a requirement or non-requirement at any point in the process.

Along with the ticket information, the seller also inputs relevant seller information into seller input device 10, such that seller server 50 can verify that the seller has previously registered with host system 30, signed a consignment agreement and has not previously conducted fraudulent transactions (step 154). The system also verifies that the seller's credit card is still valid by communicating with central authorization system 90. After seller server 50 verifies the seller information, ticket server 60 suitably verifies the ticket information in ticket database 62 by transmitting a verification request to master arena database 100. In a preferred embodiment, master arena database 100 suitably verifies the existence of the event and seat, and in an alternative embodiment, the initial sale of the specific seat in the arena (step 156).

With continued reference to FIG. 4, if the ticket information is verified by master arena database 100, ticket server 60 analyzes the time and date of the event and compares the information to the current date database 64 to determine if the event falls within a predetermined time frame for redistributing the ticket (step 158). In a preferred embodiment, a seller is restricted from consigning a ticket to host system 30 if the event is within a predetermined amount of time from the time of consignment. Moreover, in a preferred embodiment, ticket server 60 limits the number of tickets which an individual seller is allowed to consign per event.

Ticket server 60 next suitably analyzes any agreements with the particular arena, promoter or entity regarding the establishment of the resale price. In another embodiment, ticket server 60 also suitably compares the State in which the event is to be conducted with State law database 66 to determine if any laws within the particular State restrict the sales price of the consigned tickets (Step 160). If the State has enacted laws restricting the resale of tickets at a price higher than the face value of the ticket or if an agreement with a particular arena prevents a higher price, the system will only add a transaction fee which conforms to any transaction fee limitation enacted by the particular State or within an arena agreement (step 162). If the state or arena does not restrict the resale of tickets at an increased price, the ticket information will also be placed in offer database 68, thereby allowing buyers to "bid" for the ticket such that the ticket will be sold to the highest bidder.

Finally, the tickets are posted (step 164) such that various buyers can either browse a web page which includes the posted tickets, or the buyer can telephone an interactive menu which reports the tickets available for resale. In a preferred embodiment, the posted tickets are removed from the database of available tickets at a predetermined time before the start of the particular event, thereby preventing the purchase of the tickets without sufficient time to obtain the tickets and attend the event.

With respect to FIG. 2, after the tickets are consigned to host system 30 (step 112), various buyers are able to browse or hear the listing of consigned tickets and select a predetermined number of event tickets for any desired event (step 114). If the event corresponding to the selected ticket is located in a State or arena which allows the sale of tickets at an increased price, as stated above, ticket server 60 suitably requests that buyer enter a "bid" for the ticket and the buyer's selection for the particular ticket is stored in offer database 68 within ticket server 60 for a predetermined amount of time. After a predetermined amount of time, host system 30 notifies buyer of the successful or unsuccessful bid and allows the particular buyer to purchase the ticket. One skilled in the art will appreciate that any known comparison/bidding system, including systems which determine successful bids based on a combination of number of tickets purchased and price submitted, is within the scope of the present invention.

After selecting a particular ticket, and if applicable, achieving a successful bid, the buyer pays for the ticket at the time of purchase using any known credit card transaction or any other payment mechanism known in the art including, for example, cash, check, smart card and/or the like (step 116). For example, buyer can submit credit card information via the Internet to the host system web page, wherein network interface 40 will retrieve the information and transmit the information to buyer server 70. Buyer server 70 suitably stores the buyer information in the respective databases, namely, buyer demographic database 72, credit card database 74, and address database 76. Buyer server 70 then transmits an authorization request including credit card database information 74 to central authorization system 90.

Upon approval from central authorization system 90, buyer server 70 suitably informs output device 80 to distribute the ticket authorization to any of the aforementioned output devices 80 selected by the buyer (step 172). Output device 80 then suitably provides tickets to buyer via a desired distribution method selected by the buyer (step 174). For example, the buyer may select receiving the tickets by standard mail, federal express, will call window pick up, printing from a kiosk, and/or some other similar means. If the buyer requests mail, interface device 40 retrieves buyer's address from address database 76 of buyer server 70. If the buyer requests will call, network interface device 40 suitably communicates the ticket information to a local ticket office instructing the will call ticket office printer to print new tickets for the event and place the tickets on reserve for pick up by the particular buyer. If the buyer requests a kiosk delivery, network interface device 40 transmits the ticket information to the kiosk such that the buyer requests the kiosk to print the tickets when the buyer is at the kiosk. One of ordinary skill in the art will appreciate that any of the aforementioned methods for ticket distribution may include any type of security measures, such as, for example, requiring identification from the buyer at a will call window, or requiring entry of a security code at a kiosk.

Seller or host system 30 deactivates or restricts the use of the original ticket by, for example, mailing the ticket to the system manager, deactivating the authorization on the ticket (deactivating bar code, magnetic stripe or other electronic authorization during attempted multiple uses of a ticket for the same seat), or informing the arena to not accept the original ticket. After the host receives the actual tickets from the seller via mail delivery electronic delivery or any other means for restricting the active status of the ticket, and the redistributed tickets based on those actual tickets was sold to a buyer, and after the event occurs and no complaints are logged related to the specific ticket, the information from the actual tickets is compared to the information previously submitted by the seller. If verified, the seller's previously reported credit card in credit card database 54 is credited a predetermined amount, such as, for example, the face value of the ticket less a transaction fee (step 120). Alternatively, seller receives payment for the sale of the ticket, which may be more or less than the face value, based on the results of the buyer bidding process, agreements with the arenas, promoters, etc and State laws. Moreover, one skilled in the art will appreciate that seller can be credited for the sale of the ticket by any form of payment including cash, check, electronic funds transfer or any other payment means.

While the present invention has been described in conjunction with preferred and alternative embodiments set forth in the drawing Figures and the specification, it will be appreciated that the invention is not so limited. Various modifications in the selection and arrangement of components, interfaces and process steps may be made without departing from the spirit and scope of the invention as set forth in the appended claims.

I claim:

1. A computer-implemented method for the redistribution of original event tickets having a face price, including the steps of:
   providing a host computer with a central database;
   posting, by individual sellers, at least one set of ticket information representing at least one original previously sold ticket;
   transmitting said set of ticket information to said central database such that each said set corresponds to an original previously sold ticket, wherein said central database is accessible for review by a plurality of buyers;
   restricting an authorization for said original ticket;
   determining, using said host computer, a sales price for a resale ticket;
   selecting, by said buyer, at least one of said resale tickets;
   purchasing, by said buyer, said resale ticket;
   distributing, using said host computer, said resale ticket to said buyer; and,
   crediting, using said host computer, an amount to said seller.

2. The method of claim 1 further including the step of enrolling said seller in said central database as a precursor to allowing seller to participate in the posting step, wherein said enrollment includes authorization of said seller information.

3. The method of claim 1 wherein said resale ticket includes at least one of a paper/cardboard ticket, a physical token, an electronic token and a stamp.

4. The method of claim 1 wherein said original ticket includes at least one of a paper/cardboard ticket, a physical token, an electronic token and a stamp.

5. The method of claim 1 wherein said posting step includes communicating said set of ticket information to said central database via at least one of a voice recognition unit, a facsimile machine, a telephone, a kiosk, a computer terminal configured for transmitting information through a modem connection, a computer terminal configured for transmitting information through an Internet connection and a direct keyboard connection to said central database.

6. The method of claim 1 wherein said step of restricting authorization for said original ticket includes at least one of: mailing, by said seller, said original ticket to a manager of said central database; deactivating said original ticket; restricting original ticket acceptance at said event; and destroying said original ticket.

7. The method of claim 1 wherein said determining step includes a computer-implemented method for accepting bids from said buyers and selecting the highest price bid after a predetermined time frame.

8. The method of claim 1 wherein said determining step includes a computer-implemented method for adding a transaction fee onto said face price of said ticket.

9. The method of claim 1 wherein said distributing step includes a computer-implemented method for distributing said authorization for said ticket to at least one of a computer terminal, kiosk, will call terminal, and printer.

10. The method of claim 1 further including the step of authorizing, via said host computer, said ticket information.

11. A computer-implemented ticket redistribution system comprising:
    a host computer having a central database including:
       a network interface device;
       a seller server communicating with said network interface device, wherein said seller server is configured to receive and store individual seller original previously sold ticket information and to authorize seller information;
       a ticket server communicating with said network interface device, wherein said ticket server is configured to receive, store, restrict authorization to said original ticket and authorize resale ticket information and to establish a sales price;
       a buyer server communicating with said network interface device, wherein said buyer server is configured to receive and store buyer information and to authorize buyer information; and,
       an output device communicating with said buyer server, wherein said output device is configured to transmit an authorization for printing a copy of said resale ticket;
    a seller input device configured to communicate said seller original ticket information to said central database; and,
    a buyer input device configured to communicate said buyer information to said central database.

12. The system of claim 11 wherein said output device is configured to communicate an authorization for said resale ticket to at least one of a computer terminal, kiosk, will call terminal, and printer.

13. The system of claim 11 wherein said ticket server is configured to accept bids from said buyers and select a highest price bid after a predetermined time frame.

14. The system of claim 11 wherein said seller input device includes at least one of a voice recognition unit, a facsimile machine, a telephone, a kiosk, a computer terminal configured for transmitting information through a modem connection or a computer terminal configured for transmitting information through an Internet connection and a direct keyboard connection to said central database.

15. The system of claim 11 wherein said buyer input device includes at least one of a voice recognition unit, a facsimile machine, a telephone, a kiosk, a computer terminal configured for transmitting information through a modem connection or a computer terminal configured for transmitting information through an Internet connection and a direct keyboard connection to said central database.

16. The method of claim 1, wherein said distributing step includes distributing an authorization for said resale ticket to an output device which is accessible by said buyer and producing a representation of said resale ticket at said output device.

* * * * *